US008259861B2

(12) United States Patent
Kuhtz

(10) Patent No.: US 8,259,861 B2
(45) Date of Patent: Sep. 4, 2012

(54) METHODS AND SYSTEMS FOR PROVIDING BANDWIDTH ADJUSTMENT

(75) Inventor: Christian Kuhtz, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 823 days.

(21) Appl. No.: 11/300,212

(22) Filed: Dec. 14, 2005

(65) Prior Publication Data

US 2006/0222110 A1 Oct. 5, 2006

Related U.S. Application Data

(60) Provisional application No. 60/667,018, filed on Mar. 31, 2005.

(51) Int. Cl.
*H03D 3/00* (2006.01)
(52) U.S. Cl. ....................................................... 375/334
(58) Field of Classification Search .................. 709/235, 709/244, 231; 370/231, 230, 236, 468, 465, 370/477; 375/240.02, 240.01, 240.03, 240.12, 375/334, 316, 322; 348/207.99
See application file for complete search history.

(56) References Cited

U.S. PATENT DOCUMENTS

| 4,439,784 | A | 3/1984 | Furukawa et al. | 358/86 |
|---|---|---|---|---|
| 4,769,697 | A | 9/1988 | Gilley et al. | 358/84 |
| 4,802,022 | A | 1/1989 | Harada | 358/349 |
| 4,907,079 | A | 3/1990 | Turner et al. | 358/84 |
| 5,278,654 | A | 1/1994 | Yang | 358/190 |
| 5,793,409 | A | 8/1998 | Tetsumura | 348/1 |
| 6,025,869 | A | 2/2000 | Stas et al. | 725/28 |
| 6,052,734 | A * | 4/2000 | Ito et al. | 709/235 |
| 6,240,460 | B1 * | 5/2001 | Mitsutake et al. | 709/235 |
| 6,260,111 | B1 | 7/2001 | Craig et al. | 711/115 |
| 6,493,317 | B1 * | 12/2002 | Ma | 370/237 |
| 6,496,516 | B1 * | 12/2002 | Dabecki et al. | 370/460 |
| 6,715,007 | B1 * | 3/2004 | Williams et al. | 710/52 |
| 6,741,563 | B2 * | 5/2004 | Packer | 370/231 |
| 6,798,787 | B2 * | 9/2004 | Kikuchi et al. | 370/468 |
| 6,889,382 | B1 | 5/2005 | Anderson | 725/10 |
| 6,961,341 | B1 * | 11/2005 | Krishnan | 370/412 |
| 7,047,305 | B1 * | 5/2006 | Brooks et al. | 709/231 |
| 7,065,586 | B2 * | 6/2006 | Ruttenberg et al. | 709/244 |

(Continued)

FOREIGN PATENT DOCUMENTS

WO WO/03/058478 7/2003

OTHER PUBLICATIONS www.businessweek.com, "Automatic Web Downloads—Without the Overload," Nov. 24, 2001.

(Continued)

*Primary Examiner* — Kevin M Burd
(74) *Attorney, Agent, or Firm* — Cantor Colburn LLP

(57) ABSTRACT

Systems and methods are disclosed for providing bandwidth adjustment. The disclosed systems and methods may include receiving an input signal having at least one attribute and an input bandwidth. Furthermore, the disclosed systems and methods may include producing a first adjusted signal. The first adjusted signal may comprise the input signal with a first adjusted bandwidth. The first adjusted bandwidth may comprise the input bandwidth adjusted based on the at least one attribute and at least one first preference. In addition, the disclosed systems and methods may include providing the first adjusted signal to a first end use device.

20 Claims, 3 Drawing Sheets

U.S. PATENT DOCUMENTS

| | | | |
|---|---|---|---|
| 7,274,740 B2 * | 9/2007 | van Beek et al. | 375/240.02 |
| 2001/0025377 A1 * | 9/2001 | Hinderks | 725/109 |
| 2001/0031633 A1 | 10/2001 | Tuomela et al. | 455/417 |
| 2002/0046099 A1 | 4/2002 | Frengut et al. | 705/14 |
| 2002/0080721 A1 * | 6/2002 | Tobagi et al. | 370/236 |
| 2002/0104087 A1 | 8/2002 | Schaffer et al. | 725/46 |
| 2002/0144259 A1 | 10/2002 | Gutta et al. | 725/10 |
| 2002/0164987 A1 | 11/2002 | Caronni et al. | 455/445 |
| 2002/0178440 A1 | 11/2002 | Agnihotri et al. | 725/10 |
| 2002/0194586 A1 | 12/2002 | Gutta et al. | 725/10 |
| 2003/0004743 A1 | 1/2003 | Callegari | 705/1 |
| 2003/0028872 A1 | 2/2003 | Milovanovic et al. | 725/12 |
| 2004/0071085 A1 * | 4/2004 | Shaham et al. | 370/230 |
| 2004/0170198 A1 * | 9/2004 | Meggers et al. | 370/514 |
| 2004/0183749 A1 | 9/2004 | Vertegaal | 345/7 |
| 2005/0111489 A1 * | 5/2005 | Krishnan | 370/468 |
| 2005/0183110 A1 | 8/2005 | Anderson | 725/12 |

OTHER PUBLICATIONS

D'Hont, Susy, "The Cutting Edge of RFID Technology and Applications for Manufacturing and Distribution," Texas Instruments, TIRIS, p. 1-13.

"RFID News," Texas Instruments, Issue No. 20, 2000, p. 1-12.

Ti.com, "RI-TRP-VUSA (LUHF Vehicle Tag)," Texas Instruments.

www.aimglobal.org, "Case Studies," the AIM Global Network Standards.

U.S. Appl. No. 11/304,264, filed Dec. 14, 2005.

* cited by examiner

METHODS AND SYSTEMS FOR PROVIDING BANDWIDTH ADJUSTMENT

RELATED APPLICATIONS

Under provisions of 35 U.S.C. §119(e), Applicant claims the benefit of U.S. provisional application No. 60/667,018, filed Mar. 31, 2005, entitled "Methods and Systems for Providing Video/Television Services Over a Digital Subscriber Line," which is incorporated herein by reference. Moreover, Applicant hereby incorporates by reference U.S. patent application Ser. No. 11/304,264 entitled "Methods, Systems, and Computer Program Products for Providing Traffic Control Services," which is filed on even date with the current patent application.

BACKGROUND OF THE INVENTION

I. Field of the Invention

The present invention generally relates to methods and systems for providing bandwidth adjustment. More particularly, the present invention relates to providing bandwidth adjustment based on at least one attribute and at least one first preference.

II. Background Information

Broadband bandwidth is a constrained resource when, for example, provided to an end use location such as home. Different devices within the home have different capabilities such as, for example, display resolution, frame rate, and different service/authorization levels. Thus, the conventional strategy is to allow the different devices to compete for bandwidth. Different users may, however, have different need or authorization levels. Moreover, there is not a one-to-one user-to-device mapping. This often causes problems because the conventional strategy does not address consumer needs for more ways to control bandwidth utilization among competing devices. Consequently, service providers need to better manage network bandwidth.

In view of the foregoing, there is a need for methods and systems for providing bandwidth adjustment more optimally. Furthermore, there is a need for providing bandwidth adjustment based on at least one attribute and at least one first preference.

SUMMARY OF THE INVENTION

Consistent with embodiments of the present invention, systems and methods are disclosed for providing bandwidth adjustment.

In accordance with one embodiment, a method for providing bandwidth adjustment comprises receiving an input signal having at least one attribute and an input bandwidth, producing a first adjusted signal, the first adjusted signal comprising the input signal with a first adjusted bandwidth, the first adjusted bandwidth comprising the input bandwidth adjusted based on the at least one attribute and at least one first preference, and providing the first adjusted signal to a first end use device.

According to another embodiment, a system for providing bandwidth adjustment comprises a memory storage for maintaining a database and a processing unit coupled to the memory storage, wherein the processing unit is operative to receive an input signal having at least one attribute and an input bandwidth, produce a first adjusted signal, the first adjusted signal comprising the input signal with a first adjusted bandwidth, the first adjusted bandwidth comprising the input bandwidth adjusted based on the at least one attribute and at least one first preference, and provide the first adjusted signal to a first end use device.

In accordance with yet another embodiment, a computer-readable medium which stores a set of instructions which when executed performs a method for providing bandwidth adjustment, the method executed by the set of instructions comprising receiving an input signal having at least one attribute and an input bandwidth, producing a first adjusted signal, the first adjusted signal comprising the input signal with a first adjusted bandwidth, the first adjusted bandwidth comprising the input bandwidth adjusted based on the at least one attribute and at least one first preference, and providing the first adjusted signal to a first end use device.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
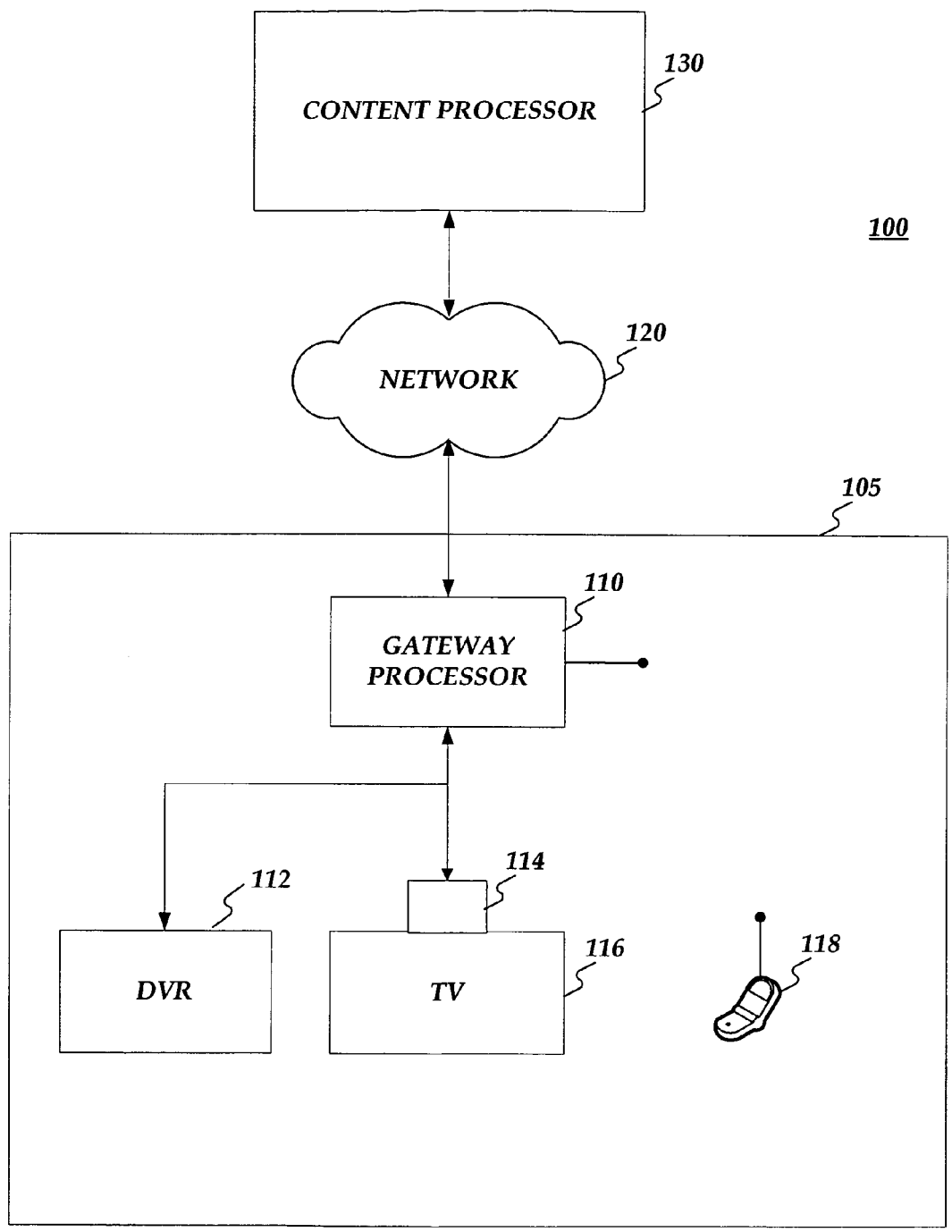
FIG. 1 is a block diagram of an exemplary bandwidth adjustment system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide bandwidth adjustment. For example, an end use location receives data service using a digital subscriber line (DSL), broadband, or fiber optical cable. The data service includes receiving, for example, a video stream or other data from the service provider. Regardless of how the end use location is served, there is a limited bandwidth amount available. Furthermore, there are multiple device at the end use location capable of receiving data service. Each of these multiple devices are able to receive service at different data rates. Moreover, users at the end use location may prefer different data rates based, for example, on content received on one of the multiple devices. For example, a user may wish to receive sports content at the highest possible resolution, but the user may not want high resolution for news or home improvement shows.

Consistent with embodiments of the present invention, a gateway processor at the end use location knows what multiple devices at the end use location are available for receiving broadband service. In addition, the gateway processor knows the bandwidth capability of each of the multiple devices. Furthermore, the gateway processor knows user preferences such as data rate preferences of a user or users at the end use location. For example, the gateway processor may know that there is a digital video recorder (DVR) at the end use location recording a particular channel at a specific point in time and a specific resolution. In this situation, the gateway processor, based on user preferences, may give bandwidth priority to the DVR and prune bandwidth to any other device while the DVR is recording. The aforementioned user preferences are exemplary and others may be used.

In addition to user preferences, the gateway processor knows a certain attribute or attributes of an incoming data stream. For example, using data encoded in the incoming data stream, the gateway processor cross references the encoded data with an electronic programming guide (EPG.) Accordingly, the gateway processor may learn attributes associated with the incoming stream's content. For example, the attribute may comprise, but are not limited to, content type (e.g. sports, news), which actors or personalities are in the content, who produced the content, and how long the content lasts. In addition, the attributes may indicate how big the frame originally was or how many frames per second are being sent, for example. The aforementioned attributes are exemplary and others may be used. Accordingly, based on attributes of an incoming stream and preferences associated with the user or device, the gateway processor prunes or otherwise adjusts the bandwidth of data associated with the incoming stream and provides the adjusted stream to an end use device.

The gateway processor can prune or otherwise adjust bandwidth in a number of ways. For example, if the incoming data stream is video, some video encoding formats allow a stream to be encoded for multiple bit rates. If an encoder was instructed, for example, to create 2 mbps, 512 kbps and 128 kbps streams of a video clip (all within the same file), the streaming server originating the stream may decide (based on communication with the client, or other preferences) to send a 2 mbps stream or either of the other 2 encoded choices. This can amount to something as simple as dropping the excess data in a predictable (pre-encoded) fashion to derive the lower bandwidth streams. So, if it was determined by the gateway processor that the client needed/wanted/could only consume 128 kbps at the moment, the streaming server may prune everything not associated with the 128 kbps rate from the file that the 2 mbps stream originates.

Furthermore, a head end could have three files in the example above, containing a 2 mbps, a 512 kbps and a 128 kbps stream respectively. And signaling could determine which gets fed out. Signaling may transpire from the endpoint to the gateway and then gateway to the head end or it may stop at the gateway. The decision of how to regulate the stream, for example, may be determined by the gateway. So, a streaming server could originate the full 2 mbps stream and the gateway could then decide, based on its knowledge of whatever parameters about the content and the network environment, which stream to feed out, re-encoding, or re-shaping to match a need, for example.

Moreover, the gateway does not have to be in the stream's path. The gateway could be a function on a DVR, for example, inside a home that acts as the video hub/distribution point at a location. This may require the endpoints/clients to know about such a video hub. If the gateway is in the path, it could perform these functions transparently without knowledge/configuration of the endpoints. One place to do this transparently could be a residential gateway box (e.g. a DSL router) or some other routing/switching node in the path.

In addition, the gateway may be told about the bandwidth constraints of endpoints, the path, etc. A large number of conventional algorithms exist to sort out what bandwidth is left over once it has been allocated on portions of the path. Embodiments of the invention, for example, are not dependent on any specific algorithm.

An embodiment consistent with the invention comprises a system for providing bandwidth adjustment. The system comprises a memory storage for maintaining a database and a processing unit coupled to the memory storage. The processing unit is operative to receive an input signal having at least one attribute and an input bandwidth. In addition, the processing unit is operative to produce a first adjusted signal. The first adjusted signal comprises the input signal with a first adjusted bandwidth. The first adjusted bandwidth comprises the input bandwidth adjusted based on the at least one attribute and at least one first preference. Moreover, the processing unit may be operative to provide the first adjusted signal to a first end use device.

Consistent with an embodiment of the present invention, the aforementioned memory, processing unit, and other components may be implemented in a system for providing bandwidth adjustment, such as an exemplary bandwidth adjustment system 100 of FIG. 1. Any suitable combination of hardware, software, and/or firmware may be used to implement the memory, processing unit, or other components. By way of example, the memory, processing unit, or other components may be implemented with any of a gateway processor 110 or a content processor 130, in combination with system 100. The aforementioned system and processors are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 includes an end use location 105, a network 120, and content processor 130. End use location 105 includes gateway processor 110 and end uses devices, such as, a digital video recorder (DVR) 112, a television (TV) 116 having a set top box 114, and a mobile device 118. The aforementioned end use devices are exemplary and other end use devices may be used.

Content processor 130 provides an input signal or input signals to gateway processor 110. The input signal may correspond to a video-on-demand signal associated with a movie, for example. The input signal may correspond to a broadcast, unicast, or multicast signal corresponding to, for example, a conventional broadcast or cable television channel. End use location 105 may comprise, but not limited to, a home, a business, or any other location capable of receiving the input signal. Mobile device 118 comprises any device capable of receiving the input signal wirelessly, for example.

Figure 2:
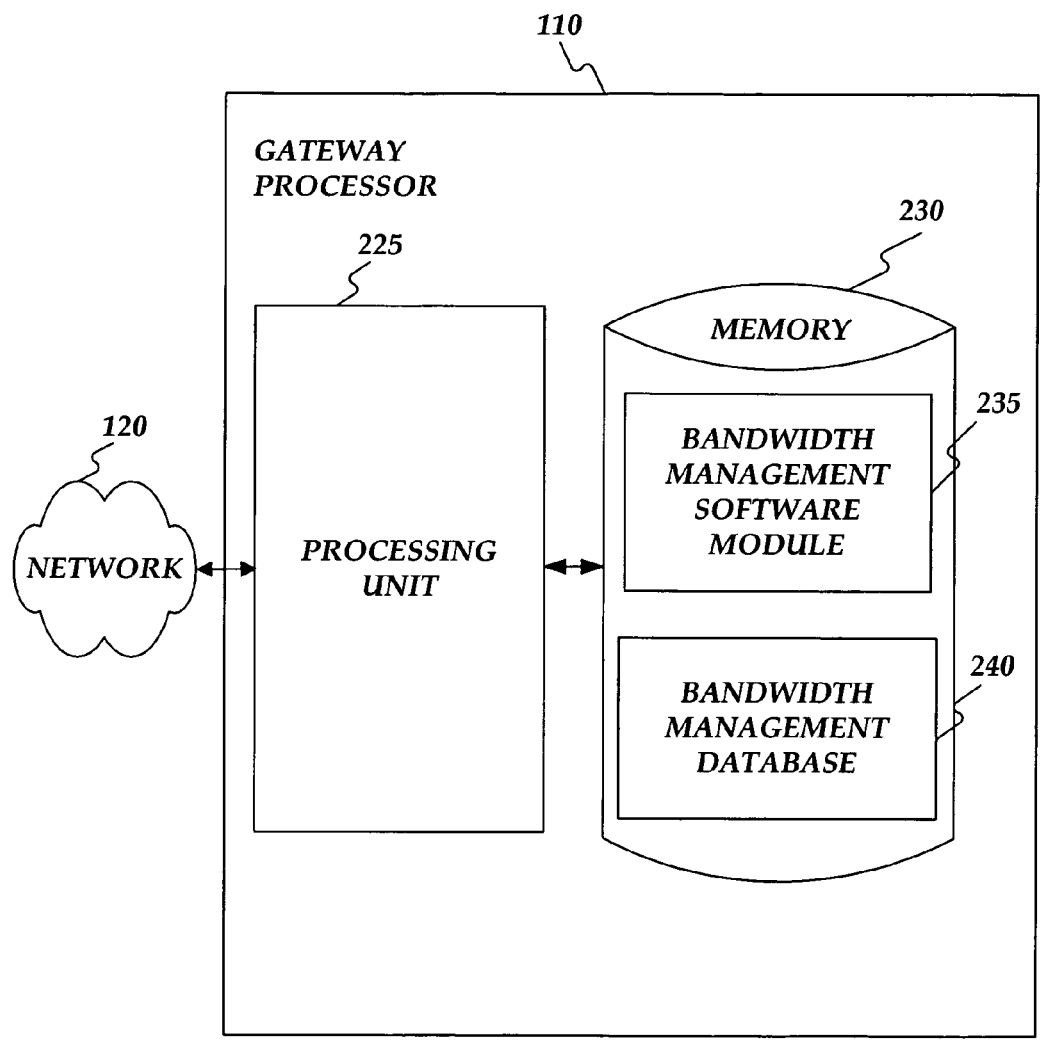
FIG. 2 is a block diagram of an exemplary gateway processor consistent with an embodiment of the present invention.

FIG. 2 shows gateway processor 110 of FIG. 1 in more detail. As shown in FIG. 2, gateway processor 110 includes a processing unit 225 and a memory 230. Memory 230 includes a bandwidth management software module 235 and a bandwidth management database 240. While executing on processing unit 225, bandwidth management software module 235 performs processes for providing bandwidth adjustment, including, for example, one or more of the stages of method 300 described below with respect to FIG. 3. Furthermore, any combination of software module 235 and database 240 may be executed on or reside in any one or more of gateway processor 110 and content processor 130 as shown in FIG. 1.

Gateway processor 110 and/or content processor 130 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

System 100 may also transmit data by methods and processes other than, or in combination with, network 120. These methods and processes may include, but are not limited to, transferring data via, diskette, flash memory sticks, CD ROM, facsimile, conventional mail, an interactive voice response system (IVR), or via voice over a publicly switched telephone network.

Figure 3:
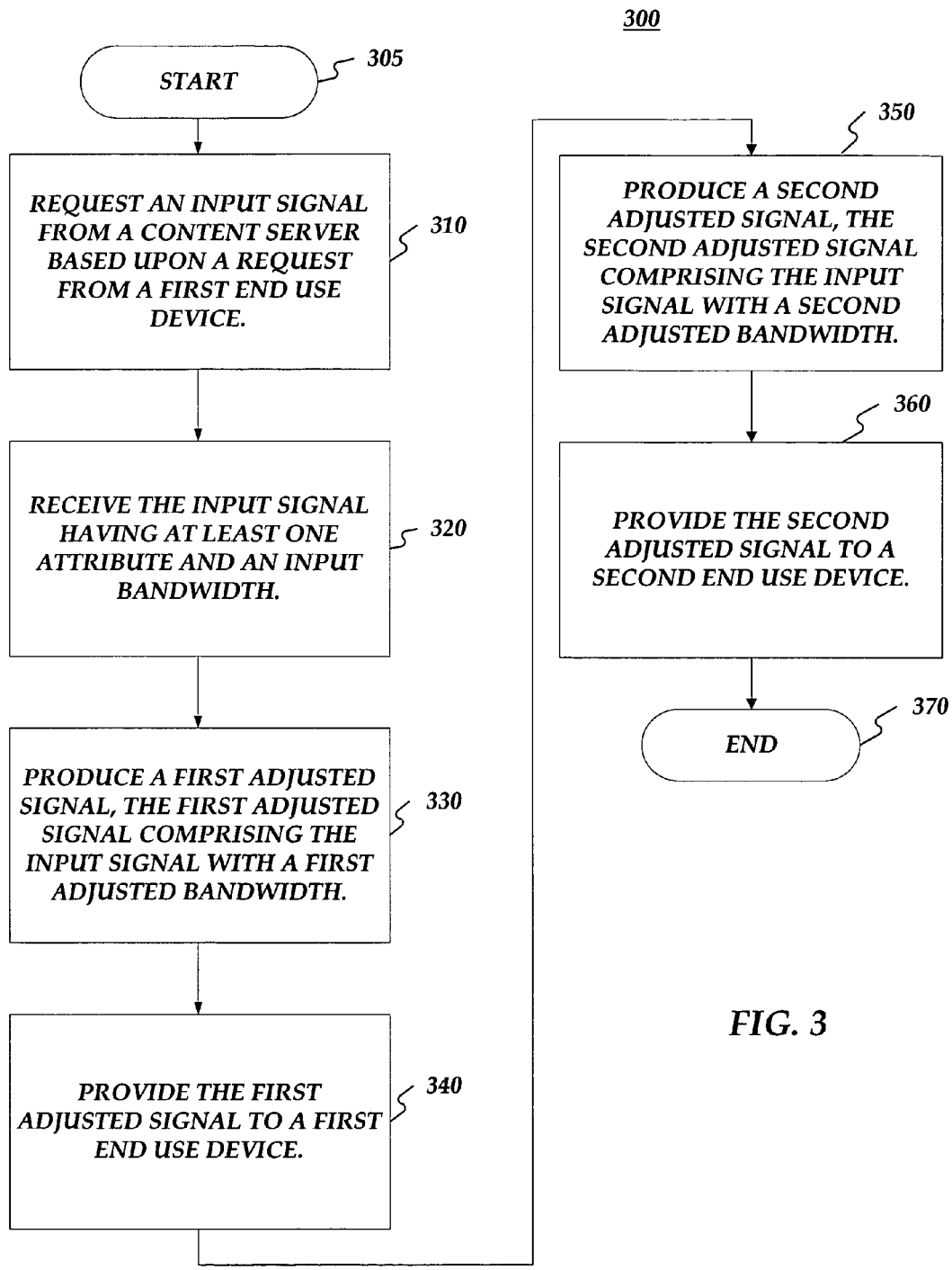
FIG. 3 is a flow chart of an exemplary method for providing bandwidth adjustment consistent with an embodiment of the present invention.

FIG. 3 is a flow chart setting forth the general stages involved in an exemplary method 300 consistent with the invention for providing bandwidth adjustment using system 100 of FIG. 1. Exemplary ways to implement the stages of exemplary method 300 will be described in greater detail below. Exemplary method 300 begins at starting block 305 and proceeds to stage 310 where gateway processor 110 requests an input signal from content processor 130 based upon a request from a first end use device (e.g. TV 116.) For example, end use location 105 receives data service using a digital subscriber line (DSL), broadband, or fiber optical cable. The data service may include receiving a video stream or other data from the service provider. Regardless of how the end use location is served, there may be a limited amount of bandwidth available to end use location 105. Multiple devices (e.g., DVR 112, TV 116, and mobile device 118) each receive service at different data rates. Moreover, users (not shown) at end use location 105 may prefer different data rates based, for example, on content received on any one of the multiple devices. For example, a user may wish to receive sports content at the highest possible resolution, but the user may not want high resolution for news or home improvement shows.

From stage 310, where gateway processor 110 requests the input signal from content processor 130, exemplary method 300 advances to stage 320 where gateway processor 110 receives the input signal having at least one attribute and an input bandwidth. For example, content processor 130 may provide the input signal or input signals to gateway processor 110. The input signals may correspond to a video-on-demand signal associated with a movie, for example. The input signal may correspond to a broadcast, unicast, or multicast signal corresponding to, for example, a conventional broadcast or cable television channel.

Once gateway processor 110 receives the input signal in stage 320, exemplary method 300 continues to stage 330 where gateway processor 110 produces a first adjusted signal. The first adjusted signal comprises the input signal with a first adjusted bandwidth. The first adjusted bandwidth may comprise the input bandwidth adjusted based on the at least one attribute and at least one first preference. For example, gateway processor 110 knows what multiple devices at end use location 105 are available for receiving the input signal. In addition, gateway processor 110 knows the bandwidth capability of each of the multiple devices. Furthermore, gateway processor 110 knows the at least one first preferences of a user or users at end use location 105. Also, for example, gateway processor 110 knows that DVR 112 at the end use location is recording a particular channel at a specific point in time and a specific resolution. In this situation, the gateway device 110 may give bandwidth priority to DVR 112 and prune bandwidth to any other device while DVR 112 is recording.

Furthermore, gateway processor 110 knows a certain attribute or attributes of an incoming stream. For example, using data encoded in the incoming stream, gateway processor 110 cross references the encoded data with an electronic programming guide (EPG.) Accordingly gateway processor 110 learns attributes associated with the incoming stream's content. For example, the attributes may comprise, but are not limited to, content type (e.g. sports, news), which actors or personality were in the content, who produced the content, and how long does the content last. In addition, the attribute may indicate how big the frame originally was or how many frames per second are being sent, for example. Accordingly, based on attributes of an incoming stream and preferences associated with the user or device, gateway processor 110 prunes or otherwise adjust the bandwidth of data associated with the incoming stream and provide the adjusted stream to an end use device.

After gateway processor 110 produces the first adjusted signal in stage 330, exemplary method 300 proceeds to stage 340 where gateway processor 110 provides the first adjusted signal to a first end use device. For example, the first end use device may comprise, but is not limited to, any one of DVR 112, TV 116, and mobile device 118.

From stage 340, where gateway processor 110 provides the first adjusted signal, exemplary method 300 advances to stage 350 where gateway processor 110 produces a second adjusted signal. The second adjusted signal comprises the input signal with a second adjusted bandwidth. The second adjusted bandwidth comprises the input bandwidth adjusted based on the at least one attribute and at least one second preference. For example, gateway processor 110 may produce the second adjusted bandwidth in a manner similar to that by which the first adjusted bandwidth was produced as described above.

Once gateway processor 110 produces the second adjusted signal in stage 350, exemplary method 300 continues to stage 360 where gateway processor 110 provides the second adjusted signal to a second end use device. For example, the second end use device may comprise, but is not limited to, any one of DVR 112, TV 116, and mobile device 118. After gateway processor 110 provides the second adjusted signal in stage 360, exemplary method 300 then ends at stage 370.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing bandwidth adjustment, the method comprising:
   receiving a single input data stream providing media content, the input data stream having an attribute and pre-encoded to define a first stream having a first bit rate and a second stream having a second bit rate;
   determining the attribute by cross referencing data accompanying the input data stream with an electronic programming guide, the attribute being a bandwidth adjustment attribute determined by decoding information included in the electronic programming guide to describe the media content provided by the input data stream;
   producing a first adjusted data stream by pruning the input data stream to obtain the first bit rate based on the attribute, the pre-encoded first bit rate and a first preference;
   producing a second adjusted data stream by pruning the input data stream to obtain the second bit rate based on the attribute and the pre-encoded second bit rate, the second adjusted data stream corresponding to the same input data stream and the same media content, but with a second adjusted bandwidth, the second adjusted bandwidth different from a first adjusted bandwidth of the first adjusted data stream;
   providing the first adjusted data stream to a first device; and
   providing the second adjusted data stream to a second device while the first adjusted data stream is being provided to the first device.

2. The method of claim 1, further comprising requesting the input data stream from a content server based upon a request from the first device.

3. The method of claim 1, wherein the second adjusted bandwidth corresponds to the input bandwidth adjusted based on the attribute and a second preference.

4. The method of claim 1, wherein the attribute comprises a content type associated with the input data stream, a person associated with the input data stream, a content producer associated with the input data stream, how long the media content lasts, a size of a frame associated with the input data stream or and a number of frames per second sent in the input data stream.

5. The method of claim 1, wherein the first preference comprises a bandwidth capability of the first device.

6. The method of claim 1, wherein the input data stream comprises a video stream.

7. The method of claim 1, wherein the first device comprises a television set top box.

8. A system for providing bandwidth adjustment, the system comprising:
   a memory to maintain a database; and
   a processor in communication with the memory, wherein the processor operates to:
      receive a single input data stream providing media content, the input data stream having an attribute and pre-encoded to define a first stream having a first bit rate and a second stream having a second bit rate;
      allocate a first bandwidth priority to a first device relative to a second device, the first bandwidth priority determined based on a first user preference;
      produce a first adjusted data stream, the first adjusted data stream corresponding to the input data stream with a first adjusted bandwidth, the first adjusted bandwidth being achieved by pruning the input data stream to obtain the first bit rate, based on the attribute, the pre-encoded first bit rate, the first bandwidth priority, and the first user preference; and
      provide the first adjusted data stream to the first device.

9. The system of claim 8, wherein the processor operates to request the input data stream from a content server based upon a request from the first device.

10. The system of claim 8, wherein the processor operates to:
   produce a second adjusted data stream, the second adjusted data stream corresponding to the same input data stream and the same media content, but with a second adjusted bandwidth, the second adjusted bandwidth corresponding to the input bandwidth being achieved by pruning the input data stream to obtain the second bit rate based on the attribute, the pre-encoded second bit rate, a second bandwidth priority allocated to the second device and a second preference; and
   provide the second adjusted data stream to the second device.

11. The system of claim 8, wherein the attribute comprises a content type associated with the input data stream, a person associated with the input data stream, a content producer associated with the input data stream, how long the media content lasts, a size of a frame associated with the input data stream, or and a number of frames per second sent in the input data stream.

12. The system of claim 8, wherein the first user preference further comprises a bandwidth capability of the first device.

13. The system of claim 8, wherein the input data stream comprises a video stream.

14. A tangible computer-readable medium, excluding propagating signals, which stores computer-readable instructions which when executed cause a machine to perform a method for providing bandwidth adjustment, the method executed by the instructions comprising:
   determining an attribute of a single input data stream pre-encoded to define a first stream having a first bit rate and a second stream having a second bit rate by cross referencing data accompanying the input data stream with an electronic programming guide, the attribute being a bandwidth adjustment attribute determined by decoding information included in the electronic programming guide to describe media content provided by the input data stream;
   allocating a first bandwidth priority to a first device relative to a second device, the first bandwidth priority determined based on a first user preference;
   producing a first adjusted data stream by pruning the input data stream to obtain the first bit rate based on the attribute, the pre-encoded first bit rate, the first bandwidth priority, and the first user preference;
   producing a second adjusted data stream by pruning the input data stream to obtain the second bit rate based on the attribute and the pre-encoded second bit rate, the second adjusted data stream corresponding to the same input data stream and the same media content, but with a second adjusted bandwidth, the second adjusted bandwidth being different from a first adjusted bandwidth of the first adjusted data stream;
   providing the first adjusted data stream to the first device; and
   providing the second adjusted data stream to the second device while the first adjusted data stream is being provided to the first device.

15. The computer-readable medium of claim 14, further comprising requesting the input data stream from a content server based upon a request from the first device.

16. The computer-readable medium of claim 14, wherein the second adjusted bandwidth corresponds to the input bandwidth adjusted based on the attribute, a second bandwidth priority allocated to the second device and a second preference.

17. The computer-readable medium of claim 14, wherein the attribute comprises a content type associated with the input data stream, a person associated with the input data stream, a content producer associated with the input data stream, how long the media content lasts, a size of a frame associated with the input data stream, or a number of frames per second being sent in the input data stream.

18. The computer-readable medium of claim 14, wherein the first user preference comprises a bandwidth capability of the first device.

19. The computer-readable medium of claim 14, wherein the input data stream comprises a video stream.

20. The computer-readable medium of claim 14, wherein the first device comprises a television set top box.

* * * * *